No. 700,901. Patented May 27, 1902.
A. CROSS OF ALBERT.
PRUNING IMPLEMENT.
(Application filed Oct. 16, 1901.)
(No Model.)
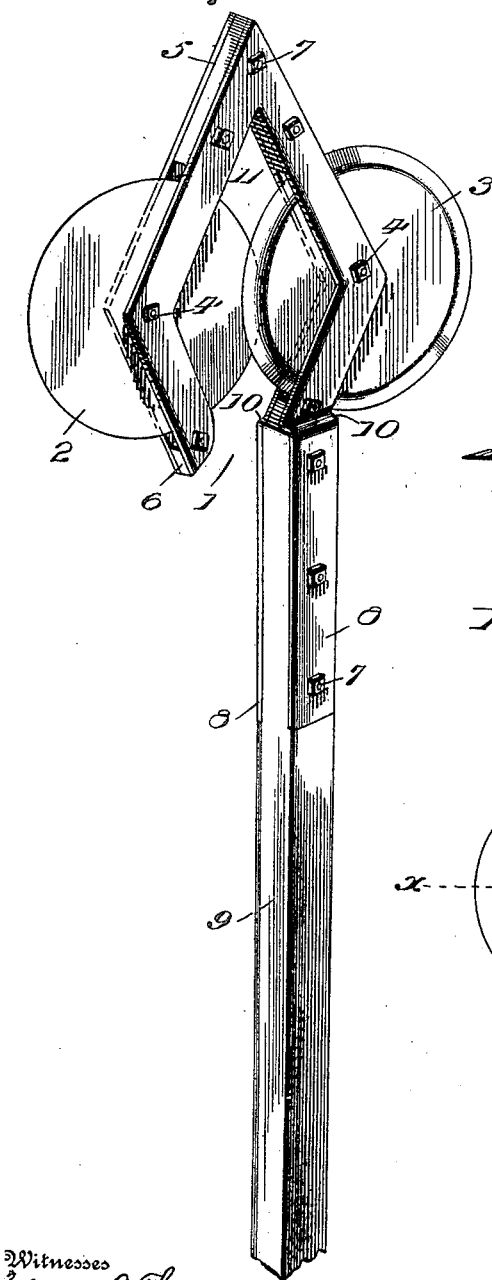
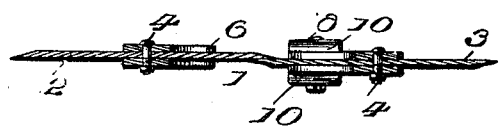
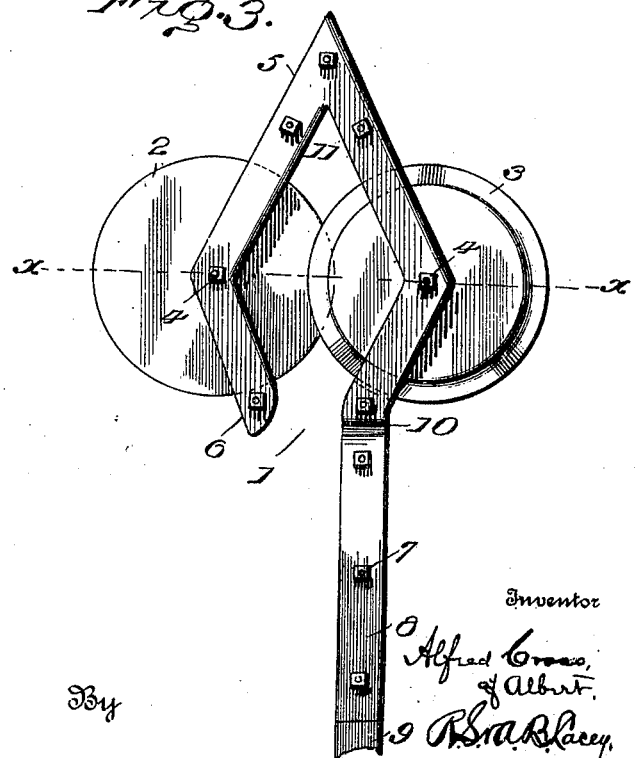
Witnesses
Gladys L. Thompson
Irwin Matthews
Inventor
Alfred Cross,
of Albert.
By R. S. & A. B. Lacey,
Attorneys
THE NORRIS PETERS CO., PHOTO-LITHO., WASHINGTON, D. C.

UNITED STATES PATENT OFFICE.

ALFRED CROSS OF ALBERT, OF MITCHELL, OKLAHOMA TERRITORY.

PRUNING IMPLEMENT.

SPECIFICATION forming part of Letters Patent No. 700,901, dated May 27, 1902.

Application filed October 16, 1901. Serial No. 78,895. (No model.)

*To all whom it may concern:*

Be it known that I, ALFRED CROSS OF ALBERT, a citizen of the United States, residing at Mitchell, in the county of Lincoln and Territory of Oklahoma, have invented certain new and useful Improvements in Pruning Implements; and I do hereby declare the following to be a full, clear, and exact description of the invention, such as will enable others skilled in the art to which it appertains to make and use the same.

The purpose of this invention is the provision of simple, effective, and easily-operable means for lopping off branches in the operation of trimming and pruning trees, convenience of handling also constituting a factor in the make-up of the implement. The tool is constructed to enable the use of both hands of the operator in its manipulation, thereby distinguishing from devices for a like purpose having a movable cutter or part required to be positively worked by one hand of the person engaged in the pruning or trimming operation, with the result that one hand only of the operator is available for use in handling and manipulating the device.

The invention is summarized in the appended claims, and the best form of manufacture now known to me is constructed substantially as shown in the drawings and hereinafter described in detail.

Referring to the drawings, in which corresponding parts are denoted by like reference characters, Figure 1 is a perspective view of a pruning implement embodying the salient features of the invention. Fig. 2 is a section on the line X X of Fig. 3. Fig. 3 is a side elevation.

The head or frame of the implement is of lanceolate form, this being of special advantage in admitting of the upper end of the implement being readily passed between branches and thick foliage, the stems and twigs of which are readily parted by the point of the head when pushed upward therethrough to reach the desired part to be removed. The lance-shaped head or frame is open at its lower end, as shown at 1, to provide an entrance for the branch or part to be lopped off. The side bars of the frame are oppositely inclined from a point intermediate of their ends and rotary cutters 2 and 3 are journaled to the side bars at their point of flexion and their edge portions are beveled to a cutting edge, and these rotary or disk cutters are arranged with their inner portions overlapped and are mounted upon journals 4, which in the present instance consist of bolts or like fastenings, also performing the office of connecting the companion members or side pieces comprising the frame or head. The frame or head is preferably composed of complementary members or parts of duplicate construction and spaced apart a distance to receive between them the rotary cutters 2 and 3. Spacing-pieces 5 and 6 are clamped by the bolts or fastenings 7 employed for holding the parts together. One of the side bars of each member or part is extended, as shown at 8, to form a shank for attachment of the head or frame to a pole or shaft 9, forming a handle by means of which the implement is manipulated when in service, the shanks 8 embracing opposite sides of the pole and secured thereto by bolts or fastenings 7. The side bars having the shanks 8 are offset, as shown at 10, to overlap the upper end of the pole or staff 9.

The rotary or disk cutters 2 and 3 are preferably of best steel and sharpened to a keen cutting edge and are oppositely disposed, being journaled to the side bars of the head or frame opposite the greatest space formed between them, this being essential for compactness of structure and to provide a clearance-space 11 at the upper end of the frame or head to prevent interference thereof with the stem or branch of the tree being pruned. These rotary cutters are mounted so as to turn freely upon the journals 4 and in practice rotate by engagement of their edges with the branch, twig, or part to be lopped off, the cutters operating by a shear action, whereby the work is made comparatively easy and with less fatigue.

The implement is used for cutting off a branch of a tree to be pruned by passing the head above the said branch and moving it until the branch enters the space 1, after which a pull downward upon the tool, assisted by the weight, causes the rotary cutters to engage with opposite sides of the branch and sever the same. By having the upper end of the frame pointed the implement is enabled to penetrate thick foliage, and the outwardly-extended parts of the rotary cutters being mounted to turn offer practically no resistance to the upward passage of the head when thrust into and through interlaced boughs to reach any particular branch. The tool, besides being effective, is durable and light, and a heavy pole or staff 9 is not required, since the only strain coming thereon is in a downward direction when pulling thereon to sever a branch to be removed. Moreover, both hands of the operator can be utilized for manipulating the tool, since there are no movable parts requiring manipulation by one of the hands.

It is to be understood that in practicalizing the invention changes in the form, proportion, and minor details of construction may be resorted to without departing from or altering the nature of the invention.

Having thus described the invention, what is claimed as new is—

1. In a pruning implement, a lanceolate-shaped frame having a space at its lower end for the reception of the branch or part to be removed, and oppositely-disposed coöperating rotary cutters journaled to the side bars of the frame at their point of flexion, substantially as set forth.

2. In a pruning implement, a frame composed of side bars each comprising oppositely-inclined parts, said bars being joined at their upper ends and spaced apart at their lower ends, and one of the side bars being extended to form a shank, a pole attached to the said shank, and oppositely-disposed coöperating rotary cutters journaled to the side bars at their point of flexion substantially as set forth.

3. In a pruning implement, a head or frame of lanceolate shape composed of spaced complementary side members or parts, filling-pieces secured between the said members, and oppositely-disposed coöperating rotary cutters located in the space between the side bars of the said members, substantially as specified.

4. The herein-described pruning implement comprising a pole or shaft, a lanceolate-shaped head or frame composed of spaced side members or parts, each composed of side bars having portions oppositely inclined, the bars being spaced at one end and one set of bars having extensions forming shanks embracing opposite sides of the pole and secured thereto and having offset portions to extend over the upper end of the pole, filling-pieces secured between the members or parts, and coöperating rotary cutters journaled between the side bars of the head at the angle formed between the oppositely-inclined parts, substantially as specified.

In testimony whereof I affix my signature in presence of two witnesses.

ALFRED CROSS OF ALBERT. [L. S.]

Witnesses:
   JNO. ROBB,
   GENEVIEVE MATTHEWS.